Patented June 16, 1942

2,286,718

UNITED STATES PATENT OFFICE 2,286,718

ANESTHETIC COMPOUND AND SOLVENT FOR THE SAME

David Curtis, New York, N. Y.

No Drawing. Application December 17, 1935,
Serial No. 54,913

10 Claims. (Cl. 260—471)

The present invention relates to new anesthetic substances, more particularly to the cinnamic acid salts of the alkyl and alkamin esters of para-amino benzoic acid, and to solvents for the same.

I have found that the linkage of the cinnamic acid radicle ($C_6H_5.CH:CH.COOH$) to any of the alkyl or alkamine esters of para-amino-benzoic acid forms anesthetic substances which are highly potent, quick acting and which have a greater solubility in certain solvents than the corresponding esters have in the same solvents.

I have thus prepared the cinnamic acid salts of ethyl-p-amino-benzoate (benzocaine), propyl-p-amino-benzoate, butyl-p-amino-benzoate, methyl-meta-amino-p-hydroxy-benzoate (orthoform), and diethyl-amino-ethanol-p-amino-benzoate (procaine). These salts are respectively as follows:

Ethyl-para-amino-benzoyl—cinnamate, having the formula:

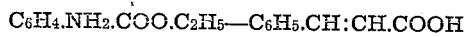

It is a white crystalline substance of a molecular weight of 313.29, and has a melting point of 101–104° C.

Propyl-p-amino-benzoyl—cinnamate, having the formula:

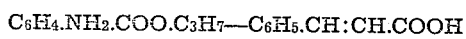

It is also a white crystalline substance of a molecular weight of 327.29, and has a melting point of 100–103° C.

Butyl-p-amino-benzoyl—cinnamate, having the formula:

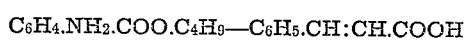

It is a white crystalline substance of a molecular weight of 349.29, and has a melting point not determined.

Methyl-meta-amino-p-hydroxy-benzoyl—cinnamate, having the formula:

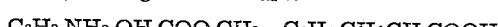

It is a reddish gray powder of a molecular weight of 316.11, and has a melting point of 94°–95° C.

Diethyl-amino-ethanol-p-amino-benzoyl—cinnamate (procaine cinnamate), having the formula:

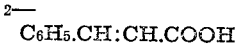

It is colorless, tacky, resinous substance, soluble in water, of a molecular weight of 374.11.

All of the foregoing cinnamates of the anesthetic esters, with the exception of the orthoform cinnamate, may be considered to have the following structural formula:

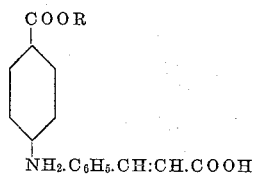

where "R" stands for an alkyl, aryl, or alkamin group. The orthoform cinnamate, which has the amino group in the meta position on the benzene ring and has a hydroxyl group in the para position has the structural formula:

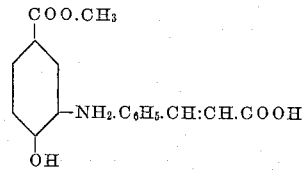

All of the anesthetic cinnamates of the present invention may be prepared by the general method of dissolving equimolecular weights of the acid and of the desired anesthetic ester in a suitable solvent, preferably an organic solvent, preferably volatile, such as acetone, and crystalizing the resulting salt therefrom in any of the usual manners, and drying by vacuum.

As a specific example, the ethyl-p-amino-benzoyl—cinnamate may be prepared by dissolving 14.8 grams of cinnamic acid in 50 cc. of C. P. acetone and dissolving 16.5 grams of benzocaine in another 50 cc. of C. P. acetone. The solutions may then be brought together and stirred to mix and complete the reaction. The salt is then crystallized from the solvent in any desirable manner and then dried by vacuum.

Certain of the anesthetic cinnamates of the present invention, notably the procaine cinnimate, which are soluble in water, may be prepared by the direct interaction of the acid and the anesthetic base in equimolecular proportions in water, by the application of heat. The solution is substantially stable for a while even upon cooling, but commences to hydrolize somewhat after a while. The addition of a small amount of an acid substance, preferably an organic acid such as tartaric or citric acid, insures stability of the solution for a longer period of time.

All of the anesthetic cinnamates of the present invention, with the exception of procaine cinnamate, are for all practical purposes, insoluble in water. I find, however, that all of the cinnamates are soluble in fixed oils, such as castor and olive oils, in essential oils, such as oil of cloves, oil of cassia, eugenol, oil of wintergreen, and the like, singly or in combination, and in emolient substances such as glycerine, with the addition, however, in the latter solvent, of an alcohol such as benzyl alcohol, or glycol, or diethylene glycol, or any of their ethers, in small amounts.

Where any of the fixed oils is used as a solvent greater solubility and greater stability of the solution may be assured by the addition of an alcohol, such as benzyl alcohol, or the glycols or their ethers, in small quantities.

When a solution of any of the above cinnamates of the present invention is desired in any of the above solvents, such a solution may be formed by the direct union of the proper proportions or quantities of the reactant components of that particular cinnamate in that solvent or solvent mixture, the reaction being speeded by the application of heat. The required reactant substances may be prepared in powder mixtures containing predetermined proportions or quantities of the cinnamic acid and the anesthetic ester, as well as any other solid ingredient that may be desired in the final solution.

Besides possessing greater anesthetic potency and enhanced solubility as compared with the anesthetic ester itself, the anesthetic cinnamates of the present invention possess many other valuable properties and advantages.

The cinnamic acid radicle present in the cinnamates of the present invention is the same one which is present as one of the healing ingredients in various balsams, such as balsam of Peru and balsam of Tolu, and may be expected to contribute the same valuable properties to the anesthetic substances containing it as it does to the balsams.

The cinnamate of procaine, which, as mentioned above, is substantially soluble in plain water, is sufficiently stable in solution, even after cooling, to be used for injection for a practicable length of time after preparation. The procaine cinnamate thus provides a valuable vehicle for introducing the cinnamic acid radicle into the body, by injection, which is desired in many instances for therapeutic purposes. The vehicle is of particular advantage in that the cinnamic acid radicle is linked to an anesthetic. Thus an aqueous solution of procaine cinnamate is a therapeutic anesthetic and a bacteriacidal product. The bacteriacidal quality is provided by the cinnamic acid radicle and is therefore a property of all of the anesthetic substances linked to it.

The anesthetic ester cinnamates of the present invention have extensive fields of usefulness. Some of them, as the procaine cinnamate, are useful as local anesthetic solutions for hypodermic injection in dental practice and in other fields of medical practice. Other, such as benzocaine cinnamate or other cinnamic acid salts of other alkyl esters of amino benzoic acid, may be utilized as surface anesthetics for the mucous tissues and for the skin, in solution or as dusting powders.

The solutions of certain of the other anesthetic cinnamates, such as benzocaine cinnamate, in fixed oils, are valuable as therapeutic agents for the prevention and treatment of sun burn and for the treatment of minor burns and other skin irritations, such as insect bites and minor abrasions and cuts.

As an example of a preferred solution of a surface anesthetic for mucous tissues, I prepare the following: I dissolve, by means of heat, 7.5 grams of cinnamic acid in 100 cc. of glycerine, and to the hot solution add 8.25 grams of benzocaine. These ingredients remain in solution in the glycerine while hot. In order to prevent precipitation on cooling, I add 25 cc. of benzyl alcohol, or 25 cc. of diethylene-glycol-mon-ethyl-ether. Such a solution remains clear and stable for a long period of time.

As an example of a preferred solution of the cinnamates of the present invention in a fixed oil, I prepare the following: I dissolve the same quantities of cinnamic acid and benzocaine in 100 cc. of castor oil with the application of heat, as above, and I add about 15 cc. of the alcohol or ether mentioned above. The resulting solution is highly potent when applied to the skin and remains stable for a long period of time.

It may here be stated that hydro cinnamic acid of the formula $C_6H_5.CH_2.CH_2.COOH$, derived from cinnamic acid, may be readily used in the same manner as cinnamic acid to form salts of the anesthetic bases named with highly satisfactory results.

It may here further be stated that the term "fixed oils" appearing in this specification is not intended to include mineral oils, but refers only to vegetable and animal oils or fats. And I also wish it to be understood that whenever the term "oils" appears in the claims appended hereto, it is intended to cover a single oil or a mixture of oils.

While the foregoing is descriptive of the new anesthetic substances of the present invention and of preferred embodiments of the same in solution form and of preferred methods of the preparation of the said substances and of such solution, it is obvious that many variations may be made in the solutions or in the methods of preparation of the substances and their solutions without the use of the inventive faculties and within the spirit and scope of the claims hereto appended.

What I claim is:

1. As a new compound, a salt of cinnamic acid and an anesthetic ester of the group having the general formula of $Ar.NH_2.COOR$, where Ar stands for an aromatic nucleus of the group of $C_6H_4$ and $C_6H_3.OH$, and R stands for an alkyl or an aryl or an alkamin radicle.

2. The method for preparing a solution of a salt described in claim 1 which comprises the steps of dissolving substantially equimolecular proportions of the anesthetic ester and of cinnamic acid in a solvent comprising fixed oil.

3. The method for preparing a solution of a salt described in claim 1 which comprises the steps of dissolving substantially equimolecular proportion of the anesthetic ester and of cinnamic acid in a solvent comprising essential oil.

4. As a new composition of matter, a salt of cinnamic acid and ethyl-p-amino-benzoate.

5. As a new composition of matter, a salt of cinnamic acid and diethyl-amino-ethanol-p-amino-benzoate.

6. As a new composition of matter, a salt of cinnamic acid and methyl-meta-amino-p-hydroxy-benzoate.

7. The method for preparing a solution of a salt described in claim 1 which comprises the steps of dissolving substantially equimolecular proportions of the anesthetic ester and cinnamic acid in a solvent comprising a mixture of fixed oil and a liquid from the group of alcohol, glycol, diethylene glycol and the ethers of glycol and diethylene glycol.

8. The method for preparing a solution of a salt described in claim 1, which comprises the steps of adding substantially equimolecular proportions of the anesthetic ester and of cinnamic acid to a solvent comprising glycerine and heating the mixture.

9. The method for preparing a solution of benzocaine cinnamate, comprising the steps of adding substantially equimolecular proportions of benzocaine base and cinnamic acid to a solvent comprising glycerine and heating the mixture.

10. The method for preparing a solution of benzocaine cinnamate comprising the steps of dissolving substantially equimolecular proportions of benzocaine base and cinnamic acid in a solvent comprising a mixture of glycerine and of a liquid from the group of alcohols, glycol, diethylene glycol and the ethers of glycol and diethylene glycol.

DAVID CURTIS.